Jan. 23, 1962 E. E. EVANS 3,017,733

LAWN EDGER

Filed Oct. 27, 1959 2 Sheets-Sheet 1

INVENTOR.
Elmer E. Evans
BY
Victor J. Evans & Co.
ATTORNEYS

Jan. 23, 1962 E. E. EVANS 3,017,733

LAWN EDGER

Filed Oct. 27, 1959 2 Sheets-Sheet 2

INVENTOR.

Elmer E. Evans

BY

Victor J. Evans & Co.

ATTORNEYS 3,017,733
LAWN EDGER
Elmer E. Evans, 1007 W. Idlewild Drive, Evansville, Ind.
Filed Oct. 27, 1959, Ser. No. 849,033
4 Claims. (Cl. 56—25.4)

This invention relates to a lawn trimming or cutting device.

The object of the invention is to provide a lawn edger which is adapted to be used for trimming or cutting grass, weeds, or the like such as grass or weeds which is growing close to a wall or other structure.

Another object of the invention is to provide a lawn edger which includes a cutting mechanism that is adapted to be connected to and actuated by a conventional electric drill so that the growing grass or weeds can be conveniently severed or cut as the lawn edger of the present invention is moved there along.

A further object of the invention is to provide a lawn edger which is extremely simple and inexpensive to manufacture.

Other objects and advantages will be apparent during the course of the following description.

In the accompanying drawings, forming a part of this application, and in which like numerals are used to designate like parts throughout the same:

Figures 1, 8, 9, 10:
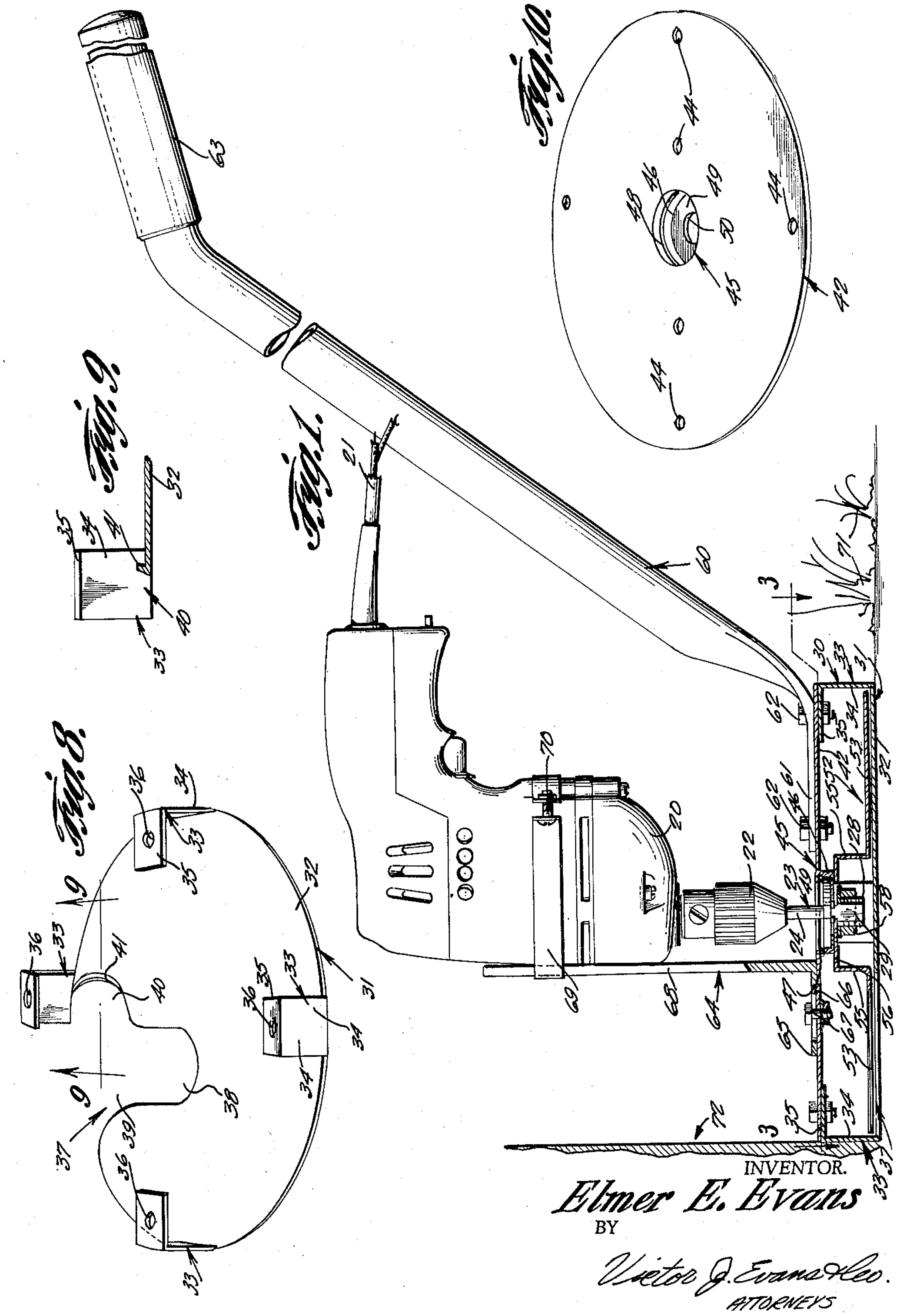
FIGURE 1 is a side elevational view of the lawn edger of the present invention, with parts shown in section.
FIGURE 8 is a perspective view showing the base with its lugs.
FIGURE 9 is an enlarged sectional view taken on the line 9—9 of FIGURE 8.
FIGURE 10 is a perspective view of the plate.

Referring in detail to the drawings, the numeral 20 indicates a conventional electric drill which is adapted to be connected to a suitable source of electrical energy, as for example by means of wires 21 and the drill 20 is provided with the usual chucks 22. The numeral 23 indicates an adapter which is adapted to be connected to the chucks 22 and the adapter 23 includes a shank 24 which has its upper end 25 somewhat flattened for engagement with the chucks 22, so that as the drill 20 is actuated, the adapter 23 will rotate. The adapter 23 further includes an annular groove 26 on its outer periphery, FIGURE 4, and the adapter also includes an enlarged shoulder 27 which is arranged below the groove 26, and the lower end of the adapter 23 is threaded as indicated by the numeral 28. The lower threaded end 28 is flattened as indicated by the numeral 29 so that the lower end of the adapter has an oblong formation for a purpose to be later described.

There is further provided a cutting mechanism which is indicated generally by the numeral 30, and the cutting mechanism 30 includes a base 31 which has a generally circular portion 32, FIGURE 8, and formed integral with the portion 32 or secured thereto is a plurality of spaced apart L-shaped lugs 33, and as shown in the drawings the lugs 33 include an upstanding portion 34 as well as a horizontal portion 35 which is provided with an aperture 36 therein.

A base 31 is provided with a cutout 37, and the cutout 37 includes an inner portion 38 of smaller size as well as an outer portion 39 of increased size, and the cutout also includes a curved section 40, an edge of the base 31 adjacent the section 40 being provided with an upwardly extending lip or rake 41, FIGURES 8 and 9.

The cutting mechanism further includes a top plate 42 which is provided with openings 44 therein, FIGURE 10, and securing elements such as the bolts 43 extend through the openings 44 and through the apertures 36 and these securing elements 43 are adapted to have nuts arranged in engagement therewith in order to maintain the parts in their proper assembled relation. The top plate 42 is further provided with a central well 45, and the well 45 includes a vertically disposed cylindrical wall section 46 which is provided with an annular groove 48, and the numerals 47 and 47' indicate a pair of split rings, and the outer periphery of the outer ring 47' engages a groove 48, and the inner periphery of the inner ring 47 engages the groove 26 in the adapter 23. The well 45 further includes a lower wall portion 49 which has an opening 50 therein for the projection therethrough of the shoulder 27 of the adapter. A ball bearing assembly 51 is positioned in the well 45, and the ball bearing assembly 51 is interposed between the split rings 47 and 47' and the lower wall portion 49, FIGURE 4.

Figures 2, 3, 4, 5, 6, 7:
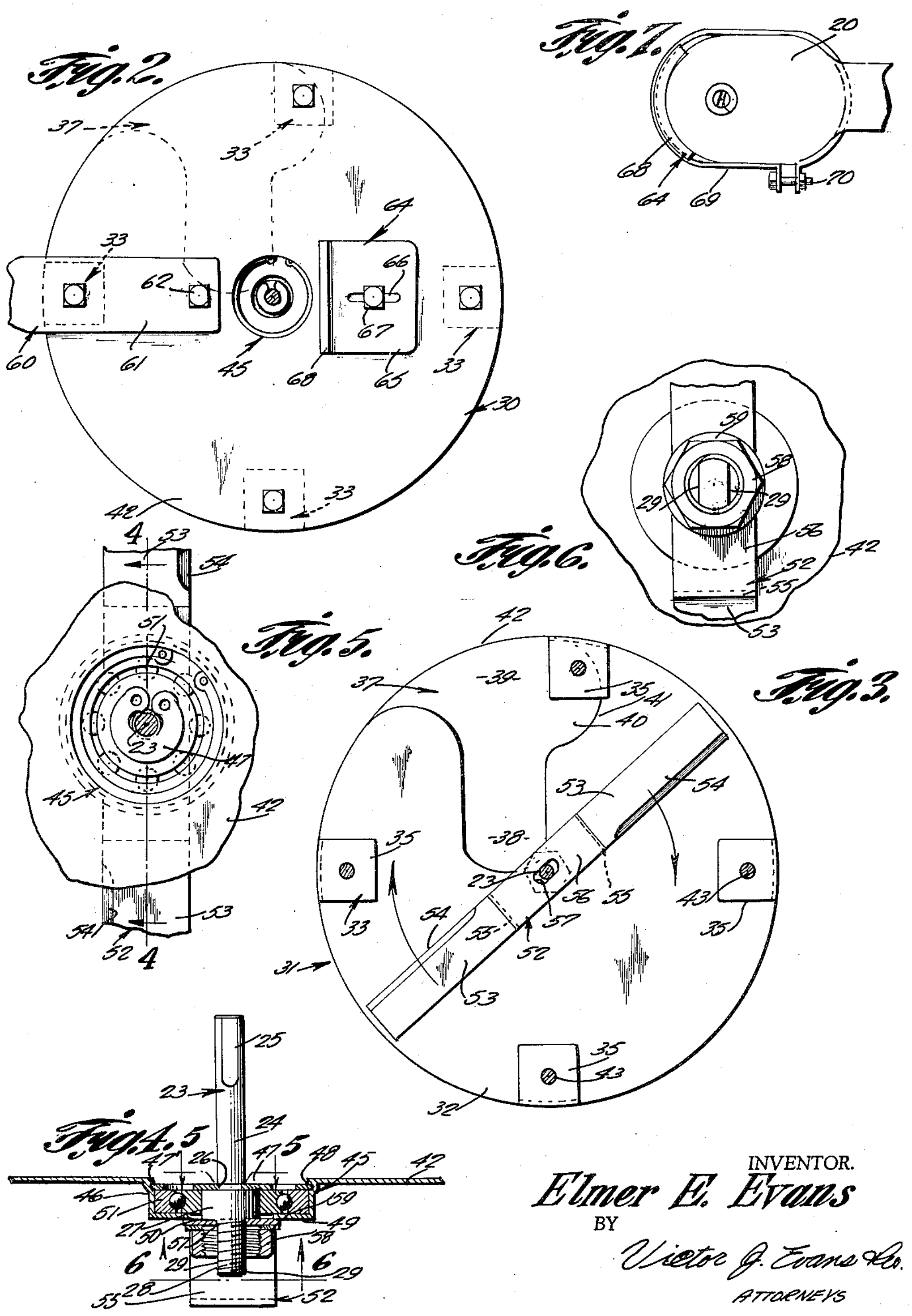
FIGURE 2 is a top plan view, with the drill removed.
FIGURE 3 is a horizontal sectional view taken through the cutting mechanism and taken on the line 3—3 of FIGURE 1.
FIGURE 4 is a fragmentary sectional view illustrating certain constructional details of the adapter and cutting mechanism and taken on the line 4—4 of FIGURE 5.
FIGURE 5 is a sectional view taken on the line 5—5 of FIGURE 4.
FIGURE 6 is a sectional view taken on the line 6—6 of FIGURE 4.
FIGURE 7 is a fragmentary plan view showing the strap for connecting the bracket to the drill.

There is further provided a rotary cutting blade which is indicated generally by the numeral 52, FIGURE 3, and the cutting blade 52 is mounted for rotation above the portion 32 of the base 31, and as shown in the drawings the cutting blade 52 includes horizontally disposed end portions 53 which are provided with sharp cutting edges 54. The rotary blade 52 further includes vertically disposed portions 55 as well as a connecting web portion 56. The web portion 56 constitutes the lower part of the shoulder when the web portion is mounted on the adapter 23. The web portion 56 is provided with a slot 57 therein for the projection therethrough of the oblong lower end 28 of the adapter 23, FIGURE 4. The numeral 58 indicates a securing element or nut which is arranged in threaded engagement with the lower threaded end 28 of the adapter 23, and a washer 59 is positioned above the nut 58.

The numeral 60 indicates a handle which is adapted to be used for moving the device from place to place as desired, and the handle 60 has its lower end 61 fastened to the cutting mechanism 30 by means of securing elements 62, while the upper end of the handle 60 is provided with a hand grip 63.

The numeral 64 indicates a bracket of L-shaped formation which includes a lower portion 65 that has a slot 66 therein, and a securing element 67 extends through the slot 66 and is connected to the top plate 42. The bracket 64 also includes a vertical portion 68 which is fastened to the drill 20 by means of a clamp 69, and the clamp 69 has a securing element 70 associated therewith.

It is apparent that there has been provided a lawn edger which is especially suitable for use in cutting grass such as the grass 71 which may be growing close to a wall or other structure 72, as for example as shown in FIGURE 1.

According to the present invention, it will be seen that the lawn edger is adapted to be connected to and actuated by a conventional electric drill 20 and the necessity of purchasing or owning an electric driving motor for the lawn edger is eliminated.

In use, with the parts arranged as shown in the drawings, it will be seen that the strap 69 is adapted to be held in place on the drill 20 by means of the securing element 70 and the strap 69 engages the elongated portion 68 of the bracket 64. The bracket 64 has its lower end 65 provided with the slot 66, and the securing element 67 can be loosened so that due to the provision of the slot 66, the position of the bracket 64 with respect to the cutting mechanism 30 can be adjusted as desired, and then the securing element 67 can be tightened. The securing element 67 serves to connect the bracket 64 to the plate 42, and the plate 42 is fastened to the lugs 33 by means of the securing element 43. The lugs 33 are formed integral with or secured to the base 31, and the handle 60 is fastened to the plate 42 by means of the securing element 62. Thus, the hand grip 63 is adapted to be conveniently gripped so that the entire mechanism can be conveniently swung or moved along as desired in order to cut the grass such as the grass 71.

It is to be noted that the base 31 is provided with the cutout 37 so that the grass which is to be cut can pass up through this cutout and into the path of the revolving cutter blade 52. The cutter blade 52 is rotated when the drill 20 is turned on, the drill 20 being connected to a suitable source of electrical energy by means of the wires 21.

It is to be noted that when the drill 20 is turned on or energized, the adapter 23 will be rotated and as the adapter 23 turns, the shoulder 27 rotates, the ball bearing assembly 51 serving to reduce friction for the rotating adapter. The split rings 47 and 47' are arranged in such a manner so as to maintain the parts in their proper assembled relationship, and the lower end 28 of the adapter is threaded and is also of oblong or generally rectangular formation, as for example as shown in FIGURE 6. This oblong lower end fits through a rectangular slot 57 in the web portion 56 of the blade 52 so that as the adapter 23 is rotated, the blade 52 will also be rotated. As the blade 52 rotates the cutting edges 54 coact with the lip 41 to respectively cut the grass and the construction is such that the device can be moved very close to a wall or the like so that hard to reach grass or weeds may be effectively and efficiently severed or cut with the present invention. The nut 58 serves to maintain the blade 52 connected to the lower end of the adapter 23, and the lock washer 59 is arranged above the nut 58, FIGURE 4.

The parts can be made of any suitable material and in different shapes or sizes.

When the edger is being used, the edger is adapted to be pulled toward the user. The member 69 may consist of a clamp, strap or the like, and this member 69 is adjustable so that it will fit drills of different sizes or shapes. Instead of using a drill, other types of driving motors may be utilized. The members 47 and 47' consist of snap rings, and as previously stated the snap rings 47 and 47' engage grooves in adjacent members.

The lawn edger will trim considerable areas in a short period of time and it is only necessary to place the lawn edger on the ground next to the walk while pulling the lawn edger toward the user. The rake 41 will help pull the grass into the path of the cutter blade 52 and the cutter blade travels within a quarter of an inch of the walk but the rake 41 will pull the grass next to the walk about three inches into the cutter blade so as to give a clean cut. Any type of drill motor such as a quarter inch drill motor will operate the edger.

Minor changes in shape, size and rearrangement of details coming within the field of invention claimed may be resorted to in actual practice, if desired.

What is claimed is:

1. In a lawn edger, a power source including a chuck; an adapter including a shank connected to said chuck, there being an annular groove in the lower portion of said shank, an enlarged shoulder below said groove, the lower end of the shank being threaded and having an oblong formation, a cutting mechanism including a base of generally circular formation provided with a cutout therein, said cutout including a curved section, an edge of said base adjacent said curved section being provided with an upwardly extending lip, L-shaped apertured lugs above said base, a circular top plate fastened to said lugs; there being a central well in said plate which includes a vertically disposed cylindrical wall section provided with an annular groove, inner and outer snap rings arranged so that the outer periphery of the outer ring engages the groove in said wall section, and the inner periphery of the inner ring engages the groove in said shank, said well further including a lower wall portion having an opening therein for the projection therethrough of the shoulder of the adapter, a ball bearing assembly positioned in said well and surrounding said shoulder, a rotary cutting blade including end portions provided with cutting edges thereon, said blade further including vertically disposed portions and a connecting web portion provided with a slot for the projection therethrough of the lower oblong end of the shank, and a securing element arranged below said web portion and threadedly engaging the lower end of the adapter.

2. The structure as defined in claim 1 and further including a handle having its lower end connected to said top plate.

3. In a lawn edger, a power source including a chuck; an adapter including a shank connected to said chuck, there being an annular groove in the lower portion of said shank, an enlarged shoulder below said groove, the lower end of the shank being threaded and having an oblong formation, a cutting mechanism including base of generally circular formation provided with a cutout therein, said cutout including a curved section, an edge of said base adjacent said curved section being provided with an upwardly extending lip, L-shaped apertured lugs above said base, a circular top plate fastened to said lugs; there being a central wall in said plate which includes a vertically disposed cylindrical wall section provided with an annular groove, inner and outer snap rings arranged so that the outer periphery of the outer ring engages the groove in said wall section, and the inner periphery of the inner ring engages the groove in said shank, said well further including a lower wall portion having an opening therein for the projection therethrough of the shoulder of the adapter, a ball bearing assembly positioned in said well and surrounding said shoulder, a rotary cutting blade including end portions provided with cutting edges thereon, said blade further including vertically disposed portions and a connecting web portion provided with a slot for the projection therethrough of the lower oblong end of the shank, and a securing element arranged below said web portion and threadedly engaging the lower end of the adapter, a handle having its lower end connected to said top plate, and L-shaped bracket having a lower section connected to said top plate, said bracket further including a vertically disposed section, and clamp for fastening the vertically disposed section of the bracket to the power source.

4. In a lawn edger, an adapter including a shank having an annular groove in the lower outer peripheral portion thereof, an enlarged shoulder below said groove, the lower end of the shank being threaded and having an oblong formation; a cutting mechanism including a base of generally circular formation provided with a cutout therein, said cutout including an outer enlarged portion and an inner smaller portion, said cutout further including a curved section, an edge of said base adjacent said curved section being provided with an upwardly extending lip, a plurality of L-shaped apertured lugs above said base, a circular top plate fastened to said lugs; there being a central well in said plate which includes a vertically disposed cylindrical wall section provided with an annular groove, inner and outer snap rings arranged so that the outer periphery of the outer ring engages the groove in said wall section, and the inner periphery of the inner ring engages the groove in said shank, said well further including a lower wall portion having an opening therein for the projection therethrough of the shoulder of the adapter; a ball bearing assembly positioned in said well and surrounding said shoulder, a rotary cutting blade including horizontally disposed end portions provided with cutting edges thereon, said blade further including vertically disposed portions and a connecting web portion provided with a slot for the projection therethrough of the lower oblong end of the shank, a securing element arranged below said web portion and threadedly engaging the lower end of the adapter, and a handle connected to said top plate.

References Cited in the file of this patent

UNITED STATES PATENTS

| | | |
|---|---|---|
| 2,793,485 | Emmons et al. | May 28, 1957 |
| 2,795,095 | Kaufman | June 11, 1957 |
| 2,814,924 | Group et al. | Dec. 3, 1957 |
| 2,833,101 | Batton | May 6, 1958 |
| 2,836,024 | Davis et al. | May 27, 1958 |
| 2,917,890 | Thomas | Dec. 22, 1959 |